United States Patent [19]

Duben

[11] 3,713,115

[45] Jan. 23, 1973

[54] MEMORY CELL FOR AN ASSOCIATIVE MEMORY

[75] Inventor: Franklin T. Duben, Dedham, Mass.

[73] Assignee: Honeywell Information Systems Inc., Waltham, Mass.

[22] Filed: Dec. 29, 1971

[21] Appl. No.: 215,966

[52] U.S. Cl. ...........340/173 AM, 307/238, 307/247, 307/291, 340/173 R, 340/173 FF

[51] Int. Cl........G11c 7/00, G11c 11/40, H03k 17/00

[58] Field of Search .....340/173 R, 173 FF, 173 AM; 307/247, 238, 291

[56] References Cited

UNITED STATES PATENTS

| | | | |
|---|---|---|---|
| 3,548,386 | 12/1970 | Bidwell | 340/173 FF |
| 3,617,772 | 11/1971 | Tertel | 340/173 R |
| 3,643,231 | 2/1972 | Lohrey | 340/173 FF |

*Primary Examiner*—Bernard Konick
*Assistant Examiner*—Stuart Hecker
*Attorney*—Aubrey C. Brine et al.

[57] ABSTRACT

A memory cell of the bistable type which is capable of being read from, written into or having its contents interrogated is disclosed herein. The memory cell performs these various operations through a minimal number of external line connections which include a word line and an interrogate line. The memory cell is capable of being arrayed in such a manner as to allow for separate operations on any number of individual cells. The memory cell is also configured in such a way as to allow for a minimal power consumption during standby. An alternative embodiment to the basic memory cell configuration eliminates the need for an interrogate line.

15 Claims, 6 Drawing Figures

| OPERATION | WORD LINE | A | B | C | D | E |
|---|---|---|---|---|---|---|
| STANDBY | 0.00V | -0.06V | -0.72V | -0.72V | 0.90V | 0.90V |
| READ | 2.70V | 2.10V | 0.90V | 0.90V | 1.50V | 0.90V |
| WRITE 1 | 2.70V | 1.95V | 0.60V | 0.60V | 1.35V | 0.00V |
| INTERROGATE 1 | 1.40V | 1.06V | 0.12V | 0.12V | 0.90V | 0.00V |
| INTERROGATE 0 | 1.40V | 0.60V | 0.00V | 0.00V | 0.00V | 0.90V |

INVENTOR

FRANKLIN T. DUBEN

BY [signature]

ATTORNEY

INVENTOR.
FRANKLIN T. DUBEN
BY [signature]
ATTORNEY

INVENTOR.
FRANKLIN T. DUBEN
BY
[signature]
ATTORNEY

INVENTOR.
FRANKLIN T. DUBEN
BY [signature]
ATTORNEY

MEMORY CELL FOR AN ASSOCIATIVE MEMORY

BACKGROUND OF THE INVENTION

This invention relates to memory cells. More specifically, this invention relates to semi-conductor memory cells adapted for use within an associated memory in electronic data processing.

Present day computer technology has created a demand for semi-conductor memory cells because of their relatively high execution speeds and their compact physical nature. These cells with the addition of a separate interrogate capability have enjoyed widespread use in the field of associative memories. However, memory cells of this type are not without their problems. One problem which is commonly encountered is that of heat dissipation. Heat severely limits the permissible number of individual memory cells which may be contained in an integrated circuit configuration. Moreover, a large amount of heat dissipation required an even larger amount of power consumption which results in large and costly power supplies.

Another problem which is commonly encountered in semi-conductor memory cells is that of minimizing the number of connections required to operate the memory element. Each memory element must contain a certain number of connections to external power, control circuitry, and to other memory elements. These connections often take up a considerable portion of an integrated circuit chip and tend to limit the size and complexity of the memory circuit portion of the chip. It is also to be realized that an associative memory cell takes up an additional amount of the integrated circuit chip for the interrogate circuitry.

Yet another problem which is common in the production of a memory circuit on an integrated circuit chip is that of the criticality of the memory circuit components themselves. A memory circuit requiring components of high tolerances is necessarily more expensive than one wherein the manufacturing preciseness is not so stringent. A significant cost saving can be appreciated when the memory cell is comprised of less precise components.

In summary, it is seen that heat and power considerations, the proliferation of circuitry and interconnections, and the cost of integrated circuit production have all contributed to the limited use of semi-conductor memory cells. These factors are especially important in large scale memory arrays.

OBJECTS OF THE INVENTION

It is therefore an object of the present invention to provide an improved semi-conductor memory cell which tends to minimize both heat dissipation and power consumption.

It is another object of this invention to provide an improved semi-conductor memory cell which requires a minimum number of external connections.

It is yet another object of this invention to provide an improved semi-conductor memory cell for use within an associative memory which contains a minimal amount of interrogate circuitry.

It is still another object of this invention to provide an improved semi-conductor memory cell which lends itself readily to low cost integrated circuit production.

SUMMARY OF THE INVENTION

To achieve the above mentioned objects, the memory cell of this invention provides a pair of cross coupled transistors each of which is connected to a respective output voltage buffer. The output voltage buffers are connected to respective digit sense lines which are biased by a bias voltage source connected to each of the digit sense lines. The cross coupled transistors are also each connected to a word line which is variously energized during the standby, read, write, and interrogate operations of the memory cell. The digit sense lines are also each connected through a pair of respective transistors to a write/interrogate logic. The write/interrogate logic energizes the digit sense lines through the respective transistor connections in various prescribed ways during the write and interrogate operations. The output voltage buffers are also connected to an interrogate line which becomes conductive when a "mismatch" condition occurs during an interrogate operation. This will all be fully explained hereinafter. An alternative embodiment of the present invention eliminates the interrogate line and provides for the sensing of an interrogate "mismatch" on the word line.

The operation of the memory cell is such as to place a minimal quiescent value on the word line during standby to thus minimize standby power dissipation so as to reduce both operating costs and heat dissipation. The operation of the memory cell also only requires a minimal number of lines and circuitry to both select the cell from the memory array as well as perform read, write and interrogate operations.

BRIEF DESCRIPTION OF THE DRAWINGS

For a better understanding of the present invention, reference should be made to the accompanying drawings wherein.

DESCRIPTION OF THE PREFERRED EMBODIMENT

Figures 1, 2:
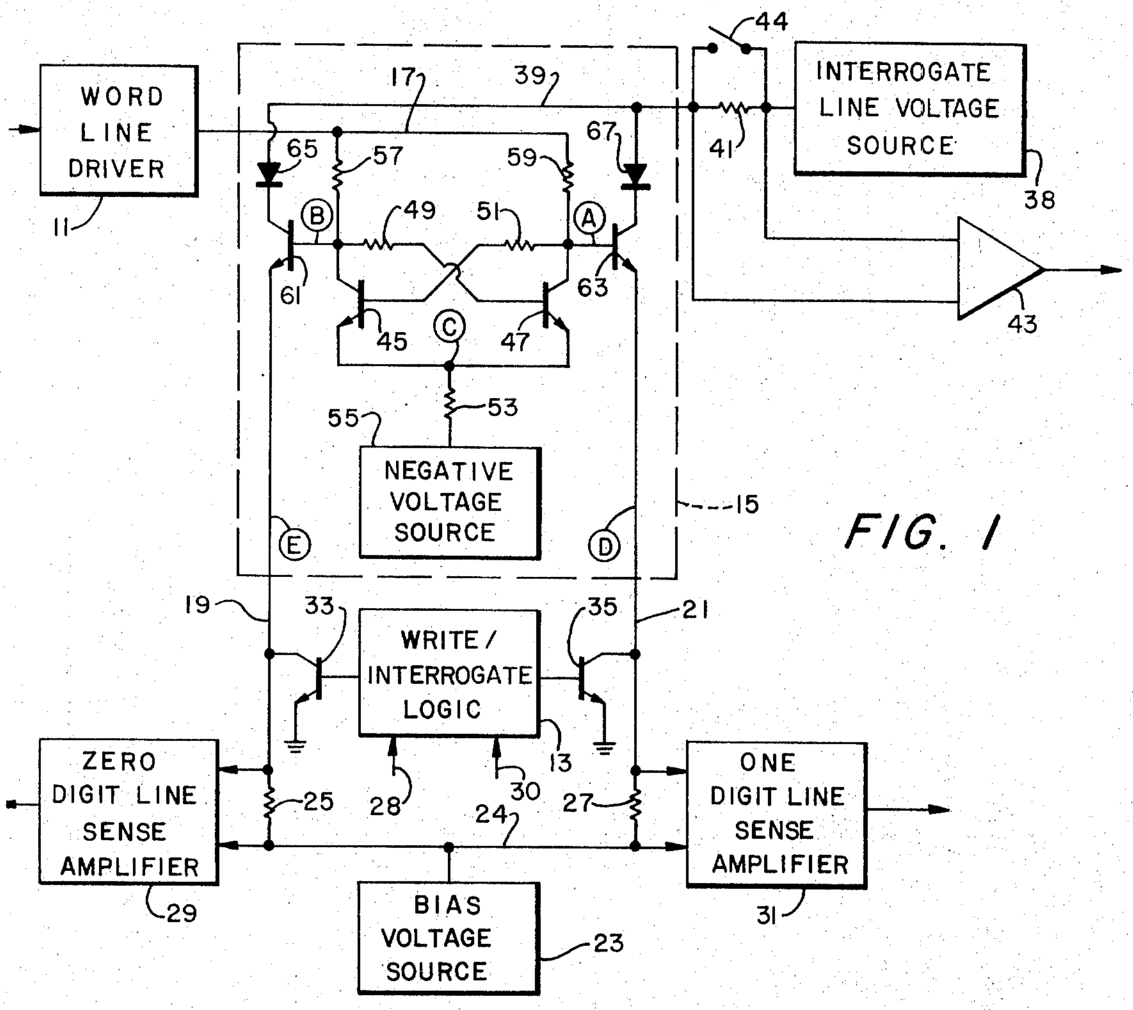
FIG. 1 is a schematic diagram of the preferred embodiment of the semi-conductor memory cell of the present invention.
FIG. 2 is a table of typical voltages occurring at various denoted locations within the memory cell of FIG. 1 under the various stipulated operating conditions.

An electrical schematic diagram of the preferred embodiment of the invention is shown in FIG. 1. In response to an external command from a computer (not shown), a word line driver 11 and a write/interrogate logic 13 provide appropriate voltages to a memory cell 15. The memory cell 15 performs either a STANDBY, READ, WRITE, or INTERROGATE operation depending upon how the word line driver 11 and the write/interrogate logic 13 are energized. The external structure of the memory cell 15 will now be described in terms of how each element functions during each operation. The internal structure of the memory cell will be fully described at a later point within the specification.

When no external operation is being performed on the memory cell 15, it is said to be in a STANDBY mode of operation. The word line driver 11 provides a quiescent value of zero volts on a word line 17 during this mode. This zero voltage minimizes the STANDBY power necessary to maintain the memory cell 15.

To perform a READ operation, the word line driver 11 raises the voltage on the word line 17 from its quiescent value of zero volts to a 2.7 volt level. The 2.7 volt level causes the memory cell 15 to produce a current in either a digit sense line 19 or a digit sense line 21. The internal operation of the memory cell is such as to produce current in only one of the digit sense lines so as to thereby indicate a particular binary value of either zero or one depending on which of the sense lines is thus energized. The current which is produced in either of these digit sense lines 19 or 21 results from a voltage drop in one of the lines that is normally not possible due to the presence of a bias voltage 23 which effectively back biases the memory cell 15. When a current is present on either of the digit sense lines, it is sensed through either a resistor 25 or 27 which is in turn amplified by either a sense amplifier 29 or 31. The amplified signal from either of the sense amplifiers 29 or 31 is sent to other data processing structure.

To perform a WRITE operation, the word line driver 11 again raises the voltage on the word line 17 to 2.7 volts. The write/interrogate logic 13 activates either a transistor 33 or a transistor 35 in response to an external computer command over a line 28, which is internally gated only upon the simultaneous occurrence of a signal on a line 30. This will be fully explained hereinafter. Activation of either the transistor 33 or the transistor 35 causes the respectively connected digit sense line 19 or 21 to be clamped to a ground reference level such as denoted in FIG. 1. This clamping action together with the voltage level on the word line 17 combine to cause the memory cell 15 to assume a desired binary state. This will be further explained hereinafter when the write operation is explained in detail. After the particular write operation is completed, the write/interrogate logic 13 unclamps the previously clamped digit sense line 19 or 21 by deactivating the previously activated transistor 33 or 35.

To perform an INTERROGATE operation, the word line driver 11 raises the word line 17 to approximately 1.4 volts which is not sufficient to produce an output on either the digit sense line 19 or the digit sense line 21. The memory cell 15 is now interrogated as to its stored binary content by clamping one of the digit sense lines 19 or 21 to ground. This is accomplished by the write/interrogate logic 13 which activates either the transistor 33 or the transistor 35 so as to clamp the respectively connected digit sense line 19 or 21 to ground as shown in FIG. 1. According to the internal operation of the memory cell 15, current will be drawn from an interrogate line voltage source 38 over an interrogate line 39 when the binary stored contents of the memory cell does not correspond to that which was interrogated for. Stated another way, if the binary value assumed by the write/interrogate logic 13 is inconsistent with the actual stored binary value in the memory cell 15, then a "mismatch" occurs and a current is drawn from the line voltage source 38 over the interrogate line 39. When a "mismatch" occurs, the current on the interrogate line 39 produces a voltage drop across a resistor 41 which is sensed by a sense amplifier 43. The sense amplifier 43 is activated only during interrogation by a switch 44 which is in parallel with the resistor 41. This "mismatch" indication from the sense amplifier 43 is processed externally in various manners well known in the art. One particular use of this signal would be in an associative memory system whereby the contents of the memory cell would be first inquired into before read out.

If the stored contents of the memory cell 15 correspond to the assumed binary value under interrogation, then the memory cell 15 will not draw any current from the interrogate line voltage source 38 through interrogate line 39. When no current is thus drawn, a "-match" condition is seen to occur.

Turning now to the internal structure of the memory cell 15, it is seen that a pair of transistors 45 and 47 are cross coupled through a pair of base resistors 49 and 51 so as to provide for a complementary emitter output. The emitter outputs of the transistors 45 and 47 are commonly connected at an emitter resistor 53 which is in turn connected to a negative voltage source 55 as shown. Binary storage in the cross coupled transistors 45 and 47 occurs by making one of the transistors conducting while making the other transistor non-conducting. The negative voltage source 55 is preferably set at a relative −1.5 volts so as to maintain the cross coupled transistors 45 and 47 in a given conductive state during STANDBY when the word line 17 is at the quiescent value of zero volts. The word line 17 is connected to a pair of word line resistors 57 and 59 which are in turn respectively connected to the collectors of the cross-coupled transistors 45 and 47. The base of each cross-coupled transistor 45 and 47 is connected to a respective base resistor 49 or 51. An output buffer transistor 61 is commonly connected at its base to the word line resistor 57 and the base resistor 49 as shown in FIG. 1. Similarly, an output buffer transistor 63 is commonly connected at its base to the word line resistor 59 and the base resistor 51. The output buffer transistors 61 and 63 are also seen to be connected through their collectors to a pair of isolating diodes 65 and 67 which are in turn each connected to the interrogate line 39. The emitters of the output buffer transistors 61 and 63 are connected to the respective digit sense lines 19 and 21 as shown in FIG. 1.

The internal functioning of the memory cell 15 will now be described in terms of each of the aforementioned overall memory operations. Referring to FIG. 2, each overall memory operation is set forth together with a series of voltage levels occurring at a series of designated locations in the circuitry of FIG. 1. It is to be understood that the voltage levels set forth in FIG. 2 are based on certain assumptions concerning the circuitry of FIG. 1. First of all, looking at the circuitry of FIG. 1, the following resistances are assigned a value of 500 ohms: the base resistors 49 and 51, the emitter resistor 53, and the word line resistors 57 and 59. Secondly, the bias voltage source 23 is assigned a value of +0.9 volts and the negative voltage source 55 is assigned a value of −1.5 volts. Next, it is assumed that a saturated transistor has equal emitter and collector voltages so that the voltage across the collector and emitter is for all practical purposes equal to zero. It is also assumed that the base to emitter drop of a conducting transistor is 0.6 volts. The final assumption which will be made is that a binary one value is stored in the memory cell 15 when the transistor 45 is conductive and the transistor 47 is non-conductive. This assumption is quite arbitrary since the memory cell 15 is completely symmetrical. Hence it should be apparent that the memory cell 15 would operate in a similar manner if the other side was conductive.

The particular voltages appearing in FIG. 2 have been calculated on the basis of the aforementioned assigned values and assumptions as to the circuitry of FIG. 1. Each of these voltages is obtainable by applying basic circuit analysis to the memory cell circuitry as it exists under the various external conditioning by the word line driver 11 and the write/interrogate logic 13. For the sake of brevity, only the first external mode of operation, namely, STANDBY will be fully described in terms of how each of these voltages occurring at points A through E is derived. For the most part, the remaining external operation of READ, WRITE 1, INTERROGATE 1, and INTERROGATE 0 will be described in terms of the voltages in FIG. 2 merely being present. The various occurring voltages of FIG. 2 will be used to illustrate how the memory cell functions internally so as to necessarily accomplish the described external operations.

First looking at the STANDBY mode of operation, the word line 17 is seen to be maintained at a quiescent level of zero volts. The negative voltage source 55 is at the same time providing a negative reference level of −1.5 volts to the circuitry of the cross coupled transistors 45 and 47. Now assuming that the memory cell 15 is storing a binary one, the transistor 45 will be conducting and the transistor 47 will be turned off. With the transistor 45 being in the conductive state there will be (1) a collector current through word line resistor 57, (2) a base current through the word line resistor 59 and the base resistor 51, and (3) an emitter current through the emitter resistor 53 to the negative voltage source 55. It will now be shown that a voltage of −0.72 volts necessarily occurs at point C under the aforementioned conductive paths associated with the conducting transistor 45. First looking at the current through the emitter resistor 53, it is seen that a 0.78 volt drop across the 500 ohm resistor results in an emitter current of 1.56 milliamps. Next assuming that a zero voltage drop occurs between the collector and emitter of the conducting transistor 45, it is seen that the voltage at point B is the same as that at point C namely −0.72 volts. This means that the collector current through the word line resistor 57 is 1.44 milliamps which is obtained by dividing the voltage at point B, namely, 0.72 volts by 500 ohms. Now looking at the base current conductive path, it is seen that a voltage of −0.12 volts exists at the base of the transistor 45 which is 0.6 volts above the emitter of the transistor 45 which is necessarily at the point C voltage of −0.72 volts. Since the word line resistor 59 and the base resistor 51 are in series (as transistor 47 is turned off), the current through these combined series resistances of 500 ohms apiece will be 0.12 volts divided by 1,000 ohms or 0.12 milliamps. Thus it is seen that the collector current through point B of 1.44 milliamps plus the base current through point A of 0.12 milliamps equals the emitter current through point C of 1.56 milliamps. The voltage at point A may now be quickly calculated as the voltage drop due to the base current through the word line resistor 59 which is 500 ohms × 0.12 milliamps or −0.06 volts. Now looking at the output buffer transistors 61 and 63, it is seen that both of these transistors is effectively back biased by the bias voltage of plus 0.9 volts provided by the bias voltage source 23 over the digit sense lines 19 and 21. The back biasing of the output buffer transistors dictates that a 0.9 voltage will be present along the digit sense lines 19 and 21. This means a 0.9 volt level for points D and E on the digit sense lines. It is thus to be appreciated that during STANDBY, neither of the digit sense lines 19 or 21 will be conductive and therefore neither of the sense amplifiers 29 or 31 will be generating data signals. At the same time the memory cell 15 is maintained in a desired conductive state with a quiescent STANDBY voltage of zero volts on the word line 17.

Next, turning to the READ mode of operation as delineated in the second row of FIG. 2, it is first seen that the word line drive 11 provides a 2.7 volt level to the word line 17. Since the memory cell 15 is assumed to be in the one state, the transistor 45 will again be conducting and its base, collector and emitter current paths will be the same as previously discussed for the STANDBY mode of operation. The voltage levels will differ however since the word line voltage is now 2.7 volts. The voltage at point A will be 2.1 volts, the voltages at points B and C will be 0.9 volts. Looking now at the output buffer transistor 61, it is seen that its base is at 0.9 volts. The emitter of the output buffer transistor 61 is also at 0.9 volts due to the 0.9 volts occurring on the digit sense line 19 as provided by the bias voltage source 23. This is reflected by a 0.9 volt level at point E on the digit sense line 19. Since there is no voltage difference across the base to emitter junction of the output transistor 61, the transistor is non-conducting and the digit sense line 19 produces no current flow through the digit sense line resistor 25. The lack of current flow through the digit sense line resistor 25 indicates that a zero has not been stored in the memory cell 15. This is further reflected in no signal being present at the output of the zero digit sense line amplifier 29. Now, looking at the voltage at point A, it is seen that the 2.1 volts occurring at the base of the output buffer transistor 63 is sufficient to allow for a 0.6 volt base to emitter drop and still provide a voltage of 1.5 volts at point D. Since point D is 0.6 volts above the bias voltage of 0.9 volts at the bottom of the digit sense line resistor 27, a signal is produced out of the sense amplifier 31 indicating that a binary one has been stored within the memory cell 15.

In order to perform a WRITE 1 operation, the word line 17 is again raised to 2.7 volts as shown in the third row of FIG. 2. At the time time, the write/interrogate logic 13 turns the transistor 33 on which clamps the digit sense line 19 to the ground reference level. This clamping of the digit sense line 19 to ground results in a zero voltage at point E as well as a zero voltage at the emitter of the output buffer transistor 61. Because the emitter of the output buffer transistor 61 is clamped at zero volts, point B is constrained to only reflect the voltage difference from its emitter to its base which is 0.6 volts for a conducting transistor. The constraining of the voltage at point B to that of 0.6 volts is determinative of the other voltages at points A, C and D. The 1.9 volts at point A is seen to be sufficient to cause a base to emitter conductance in the transistor 45 which achieves the desired results of storing a binary one within the memory cell 15. At the same time, the transistor 47 remains non-conducting due to the relatively low voltage of 0.6 volts at point B. It is thus to be appreciated that the WRITE operation for either a one or a zero is accomplished by constraining the voltage at either points B or A by appropriately clamping the respective digit sense lines 19 or 21. It is to be merely noted that voltage differences will occur across the resistors 25 and 27 during the WRITE operation. Any signals generated by the same amplifiers 29 and 31 are merely ignored during a WRITE operation.

Before discussing the INTERROGATE 1 and INTERROGATE 0 operations as shown in FIG. 2, it will first be helpful to understand in general how the memory cell 15 functions under interrogation. The memory cell 15 draws a current from an interrogate line voltage source 38 over the interrogate line 39 when a "mismatch" occurs between that which was assumed to be stored in the memory cell 15 and that which is actually stored therein. In other words, an assumption is then either proved to be correct or incorrect by ascertaining whether or not a current is present in the interrogate line 39.

Beginning with the INTERROGATE 1 operation as delineated in the fourth row of FIG. 2, the world line 17 is seen to be first brought up to 1.4 volts. Implicit in the INTERROGATE 1 operation is the initial assumption of a binary one in the memory cell 15. In this instance, the digit sense line 19 is clamped to the zero voltage reference level 37 by causing the write/interrogate line 13 to turn the transistor 33 on. The voltages which are thus seen to occur at points A and B show the non-existence of a base current through either of the output buffer transistors 61 or 63. Hence, it is seen that neither output buffer transistors 61 or 63 is conductive and hence no current is drawn through the interrogate line 39. It is therefore seen that when the stored contents of the memory cell 15 are the same as that which is assumed, there is no current conduction by either transistor 61 or 63 and hence no current is drawn from the interrogate line 39.

The INTERROGATE 0 operation (row 5, FIG. 2) will now be described with the memory cell 15 again assumed to be in the binary one storage state. Since the INTERROGATE 0 operation initially assumes a zero storage state, the digit sense line 21 is clamped to zero by the write/interrogate logic 13 turning on the transistor 35. A zero voltage level is thus present at point D on the digit sense line 21. Now looking at the output buffer transistor 63, its emitter is at a zero voltage while its base is at 0.6 volts which is also the voltage at point A. The 0.6 volts at point A causes the voltages at points B and C to be less than zero volts since the transistor 45 is conductive as the memory cell 15 is in the binary one storage state. The zero voltage at point B means that the output buffer transistor 61 will be back biased by virtue of the 0.9 volts over the digit sense line 19 as provided by the bias voltage source 23. At the same time, the output buffer transistor 63 is conducting and therefore drawing a current from the interrogate line voltage source 38 over the interrogate line 39. This drawing of current over the interrogate line 39 indicates that a "mismatch" condition has occurred in the memory cell 15. This is indicated by a signal out of the sense amplifier 43 in response to the current through the resistance 41 and the interrogate line 39. It is to be noted that the sense amplifier 43 is only activated by the switch 40 during an interrogate operation.

It is thus to be appreciated that the memory cell 15 of FIG. 1 can perform any of the aforementioned operations outlined in FIG. 2. These operations are accomplished by applying appropriate voltages over the word line 17 in conjunction with appropriate logical manipulations of the digit sense lines 19 and 21 by the write/interrogate logic 13.

Figure 3:
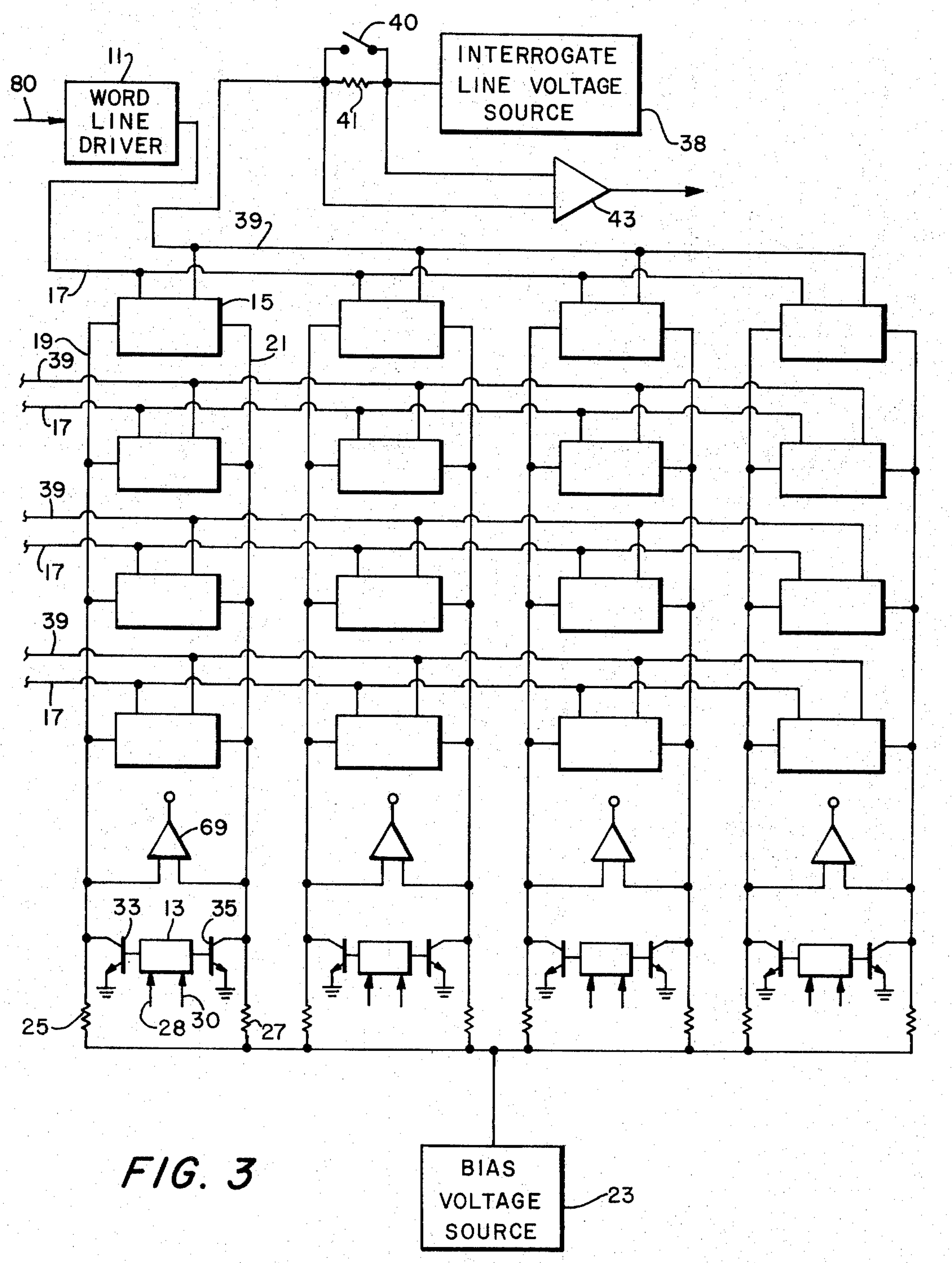
FIG. 3 is a block diagram schematically showing an array of the memory cells of FIG. 1.

Turning now to FIG. 3 which is a block diagram schematically showing the memory cells of FIG. 1 in an array pattern. The array is seen to consist of four words, wherein each word contains an individual word line 17 and an individual interrogate line 39 with four individual bit memory cells 15 connected to both lines. Each memory cell 15 is also coupled to a respective pair of digit sense lines 19 and 21 which are in turn connected to the resistors 25 and 27. The resistors 25 and 27 are connected to the common bias voltage source 23 as shown. Interposed between each pair of digit sense lines 19 and 21 and immediately above each pair of resistors 25 and 27 are sense amplifiers 69 which sense either a one or a zero depending upon the relative voltage difference appearing across them. It is to be noted that these sense amplifiers 69 replace the individual sense amplifiers 29 and 31 of FIG. 1. It is also to be appreciated that the sense amplifier 69 merely senses the voltage difference between the points D and E of FIG. 1. The direction of voltage drop indicates whether a binary one or a binary zero is present. For instance, the READ operation of FIG. 2 produces a binary one read out as the voltage drop is from point D to point E. This would merely be opposite for a binary zero read out. The only remaining connection to each memory cell 15 is that of the negative voltage source 53 which is not shown.

The write/interrogate logics 13 are connected to the digit sense lines 19 and 21 through the transistors 33 and 35 in much the same manner as shown in FIG. 1. The write/interrogate logics 13 are seen to be individually or jointly activated by the lines 28 and 30 for each write/interrogate logic. This means that each memory cell 15 may be selectively written into or interrogated without disturbing the adjacent stored bits of a given word. In the memory art, this is commonly referred to as a "masked" WRITE or a "masked" INTERROGATE capability. These masking techniques are extremely advantageous in the field of data processing. For example, it is often only necessary to interrogate the first *n* bits of each and every stored word. This can easily be accomplished in the memory array of FIG. 3 by activating only the first *n* write/interrogate logics. It is to be appreciated that the memory array of FIG. 3 is associative in nature. Each word may be first either fully or partially interrogated as to its contents prior to any actual read out of the stored contents. The entire interrogation capability in FIGS. 1 and 3 may also be dispensed with to thus arrive at a memory cell and array with reduced flexibility but still capable of read and/or write operations.

Returning to FIG. 1, the presence of the diodes 65 and 67 between the interrogate line 39 and the output buffer transistors 61 and 63 is now to be appreciated. It is seen in FIG. 3 that each interrogate line 39 and word line 17 are connected to a row of memory cells 15 which together constitute a complete word. When interrogating a complete word, one or more of the memory cells in a row may contain a mismatch which will result in current being drawn over the commonly shared interrogate line 39. It is therefore conceivable that a memory cell with a "match" condition could have a high enough voltage at either point A or point B which might cause a reverse conduction from the base to the collector of the respective output buffer transistors 61 or 63 when the interrogate line voltage had been sufficiently reduced. To prevent any such reverse current flow into the interrogate line 39, the diodes 65 and 67 are present.

Figure 4:
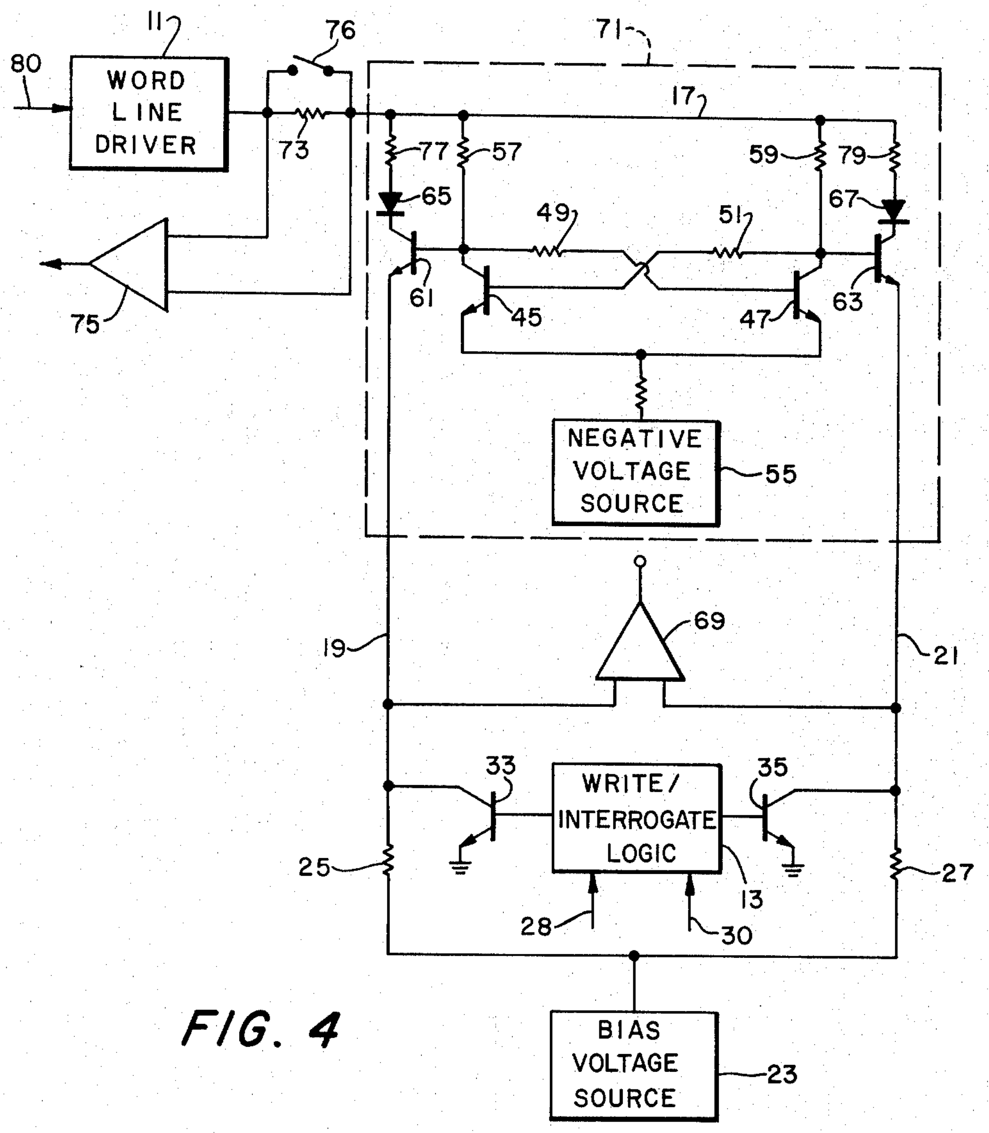
FIG. 4 is a schematic diagram of an alternative semi-conductor memory cell to that of FIG. 1.

Turning now to FIG. 4 which schematically shows a memory cell 71 that is an alternative embodiment to the basic memory cell 15 of FIG. 1. The memory cell 71 is seen to contain elements which have corresponding counterparts in the memory cell 15 of FIG. 1. These elements have been similarly labeled. The memory cell 71 differs from the memory cell 15 in that it does not require a separate interrogate line such as the interrogate line 39 of FIG. 1. Instead of a separate interrogate line, a READ capability is introduced into the word line 17. To do this, a resistance 73, and an amplifier 75 in parallel with a switch 76 (normally closed) are inserted into the word line 17 as shown. A pair of current limiting resistors 77 and 79 are connected to both the word line 17 and to the respective diodes 65 and 67. Hence, the collectors of the output buffer transistors 61 and 63 are now seen to be connected through the diodes 65 and 67 to the current limiting resistors 77 and 79 and hence to the word line 17. Current limiting resistors 77 and 79 limit the current which is drawn from the word line 17 during an interrogate operation wherein a "mismatch" condition occurs. The current limiting resistors 77 and 79 must always be of such a value as to guarantee that the word line voltage will be sufficient to effectuate an interrogation operation within the memory cell 15. In the preferred embodiment of the invention as disclosed, wherein the word line voltage is 1.4 volts, the value of resistances 77 and 79 should be 500 ohms. The only remaining resistance in the circuit is that of the resistor 73 which should be of a relatively small resistance value since it should not produce a significant drop between the word line driver 11 and the word line 17. A suitable upper limit on the resistor 73 is 250 ohms. It is to be noted that the sense amplifier 69 has been inserted between the digit sense lines 19 and 21 as has been previously explained with respect to FIG. 3.

Figure 5:
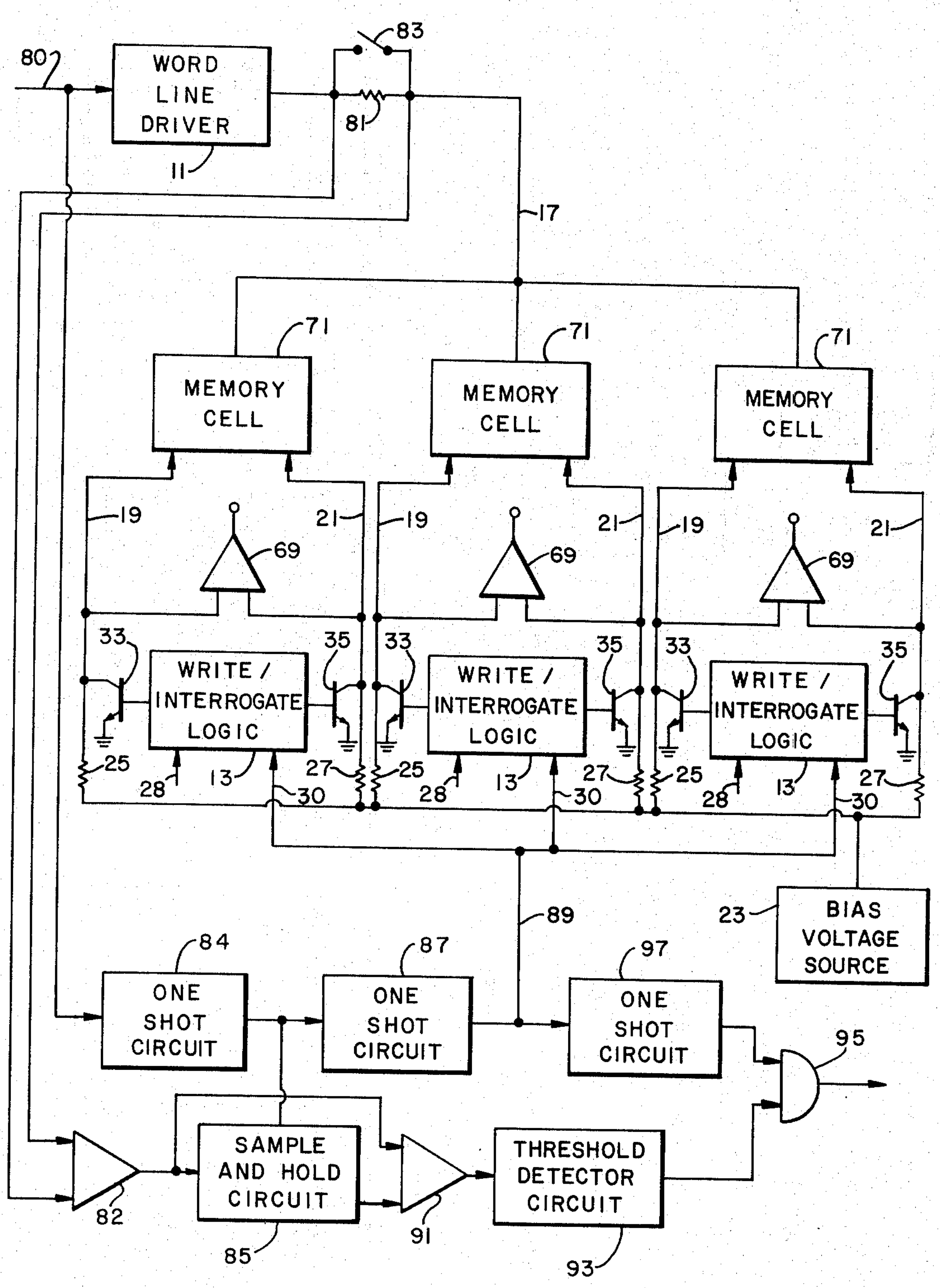
FIG. 5 is a block diagram schematically showing a single word array of the memory cells of FIG. 4; and, FIG. 6 is a schematic diagram of the write/interrogate logic used within this invention.

FIG. 5 shows several of the memory cells 71 arranged in a row configuration so as to commonly share the word line 17. The write/interrogate logics 13 and the sense amplifiers 69 are connected to the digit sense lines 19 and 21 in the same manner as previously discussed for FIGS. 3 and 4. Additional logic is shown for implementing the interrogate operation for any of these memory cells 71. The additional logic in FIG. 5 operates in a manner which will now be described. During an interrogate operation, the word line driver 11 receives an interrogate command from a computer (not shown) over a line 80. The word line driver 11 thereafter brings the word line 17 up to 1.4 volts while the current across the resistor 81 stabilizes to a steady state DC value. The time period for this transient build up is to be denoted as time "$T_1$". A switch 83 is opened during the time period $T_1$ thus producing a signal out of a sense amplifier 82 in response to the current now present in the resistor 81. While the voltage on the word line 17 is being brought up to 1.4 volts, the command signal on the line 80 is also imputed into a one shot 84 which produces a delayed output signal to a sample and hold circuit 85 after a delay equal to the time period $T_1$. The sample and hold circuit 85 is thus activated by the output signal from the one shot 84 at the time $T_1$. Since the time $T_1$ corresponds to that time required to establish a steady state current in the resistor 81, the signal stored in the sample and hold circuit 85 corresponds to a steady state condition 1.4 volts in the word line 17. The cells 71 are now ready for testing as to possinle mismatch conditions. This is accomplished within the write/interrogate logics 13 by gating the logic commands normally present on the lines 28 upon the occurrence of a clock signal on the lines 30. The clock signal on the line 30 is a delayed output signal from a one shot circuit 87 which is applied to the lines 30 over a common line 89. The delayed activation of the write/interrogate logics 13 by the one shot circuit 87 need only be sufficient to allow the sample and hold circuit 85 to have first obtained the signal from the amplifier 82. It will now be remembered that the write/interrogate logics 13 selectively clamp one of the digit sense lines 19 or 21 to a zero voltage level. Any current drawn by either of the output buffer transistors 61 or 63 (not shown here but located as in FIG. 4) will indicate a mismatch condition. This is because the output buffer transistors 61 and 63 from each memory cell 71 are connected to the word line 71, so as to draw a current from the word line 17 when a mismatch condition occurs. This will alter the steady state current in the resistor 81 which will change the signal output from the sense amplifier 82. It will be seen that the sense amplifier 82 will always directly reflect this current change through a direct input to the differential amplifier 91. This direct input is always summed with the previous steady state condition which is inputed to the same differential amplifier 91 from the sample and hold circuit 85. Thus, when a mismatch condition occurs, the differential amplifier 91 will experience a difference as between the output of the sense amplifier 82 and the output from the sample and hold circuit 85. The amplified difference from the differential amplifier 91 is applied to a threshold detector circuit 93 which is preset to output a signal only when the differential output from the differential amplifier 91 is truely indicative of a mismatch condition. To further insure that only a mismatch condition is detected, the output from the threshold detection circuit 93 is ANDed at AND gate 95 with a signal out of a one shot 97. The signal out of the one shot circuit 97 represents a signal delayed by a time $T_2$ which is sufficient to allow for the write/interrogate logics 13 to perform a "mismatch" test after the occurrence of the signal on the line 89.

The word structure of FIG. 5 is seen to lend itself to any reasonable number of memory cells 71 coupled to the same word line 17. The lack of a need for a separate interrogate line affords an even more compact memory structure than that of FIG. 3. It is to be noted that each individual memory cell 71 may be either selectively written into, read from, or interrogated. The word structure is also associative in nature due to the partial or complete interrogation capabilities prior to any read out.

Figure 6:
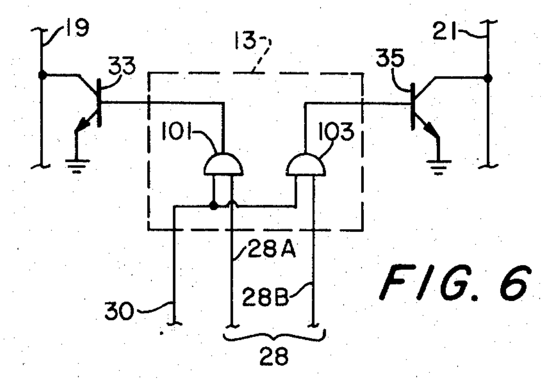

Referring now to FIG. 6 where a write/interrogate logic 13 is shown in detail. It will be remembered that the objective of the write/interrogate logic 13 is to clamp one of the digit sense lines 19 or 21 to a zero voltage reference level. This is accomplished by bringing either a line 28-A or a line 28-B logically high and thereafter gating the logically high signal through either an AND gate 101 or 103 when an enabling signal is present on the line 30. The resulting signal out of one of the AND gates 101 or 103 will turn on the corresponding transistor 33 or 35 thus grounding the respective digit sense line 19 or 21. The logically high signal will remain until completion of either memory operation.

The various memory cell configurations described herein are readily manufactured in integrated circuit form. The basic memory cells are devoid of critical components. The additional circuitry for both reading, writing and interrogating of the basic memory cell are also devoid of critical components and are hence easily manufactured by integrated circuit techniques.

The disclosed invention is thus seen to provide memory cells which lend themselves to integrated circuit construction. Each memory cell contains a minimal amount of circuitry and connections. The power supply necessary to operate the memory cells during STANDBY is also minimized and thus reduces the power consumption and/or heat dissipation in a large array of memory cells. The associative nature of the memory cells allows for interrogation prior to read out. The word structured arrays of these memory cells, also allow for individual or joint "masked" operations.

What is claimed is:

1. A memory element comprising:

control means for providing first, second, and third voltage levels;

a bistable circuit comprising a pair of cross coupled switch elements, each switch element respectively coupled to said control means;

means for interrogating said bistable circuit comprising a current generating source and a current sensing device;

two output buffer means each having a first terminal connected to one of said cross coupled switch elements, a second terminal connected to said interrogate means, and a third terminal, whereby said control means provides the first voltage level signal to said bistable circuit to maintain said bistable circuit in a stable conducting state, and said control means provides the second voltage level signal to said bistable circuit so as to cause conduction between the second and third terminals of one of said two output buffer means to thus indicate the particular binary stored contents within said bistable circuit;

logic means, connected to the third terminals of each of said two output buffer means, for selectively modifying the voltage level at the third terminal of each output buffer means, whereby said logic means selectively modifies the voltage at a selected third terminal of one of said output buffer means and said control means provides the third voltage level signal to said bistable circuit so as to cause conduction between the second and third terminals of the non-selected output buffer means to thereby draw current from said interrogate means down through the first and third terminals of the then conducting non-selected output buffer means only when the selective modification by said logic means differs from the actual stored content of said bistable circuit.

2. The memory element of claim 1 wherein said logic means comprises:

means for back biasing said output buffer means;

means for selectively modifying the back bias on said output buffer means said back bias modifying means connected to said output buffer means and to said back biasing means, said back bias modifying means operative to modify the back biasing on the third terminal of either of said output buffer means.

3. The memory element of claim 2 wherein each of said output buffer means comprises a transistor wherein the first terminal is the base of the transistor, the second terminal is the collector of the transistor, and the third terminal is the emitter of the transistor.

4. The memory element of claim 3 further comprising:

means for sensing the conductive state of either of said two output buffer means so as to sense the particular stored value within said bistable circuit, said sensing means connected to the third terminals of each of said output buffer means.

5. A memory cell capable of functioning in the read, write, standby and interrogate modes of operation comprising:

control means for providing a first voltage level for the standby mode of operation, a second voltage level for the read and write modes of operation, and a third voltage level for the interrogate mode of operation;

a bistable circuit respectively coupled to said control means comprising a pair of cross coupled first and second transistors each of which is emitter coupled to a negative voltage source;

output buffer means connected to said bistable circuit, said output buffer means operative to output a binary current indication of the presently stored contents of said bistable circuit in response to said control means providing a second voltage level signal to said bistable circuit;

current sensing means coupled to said output buffer means for sensing the binary current indication of the presently stored contents of said bistable circuit means coupled to said output buffer means for normally back biasing said output buffer means;

means for selectively modifying the normal back bias on said output buffer means, said selective modifying means connected to said output buffer means and to said back biasing means, said selective modifying means operative to modify the normal back biasing on said output buffer means by grounding one side of said output buffer means in response to a particular write binary number operation command, and operative to ground the opposite side of said output buffer means in response to an interrogate operation command for the same binary member; and interrogate sensing means, connected to said output buffer means, said interrogate sensing means comprising a voltage source and a current sensing means, said current sensing means interposed between said voltage source and said output buffer means and operative to sense any current drawn by said output buffer means during an interrogation operation when said selective modifying means selects a particular side of said output buffer means.

6. The memory cell of claim 5 wherein said output buffer means comprises:

a pair of output buffer transistors, each output buffer transistor being base connected to one of said pair of cross coupled first and second transistors, and furthermore being collector connected to said interrogate means and emitter connected to said back biasing means.

7. The memory cell of claim 6 wherein said means for selectively modifying the normal back bias on said output buffer means comprises:

a pair of normally non-conducting transistors each of which is collector connected to a respective output buffer means and emitter connected to ground; and means for turning either normally non-conducting transistor on to thereby cause the corresponding collector connected output buffer means to be grounded.

8. A memory cell capable of functioning in the read, write, standby and interrogate modes of operation comprising:

control means for providing a first voltage level for the standby mode of operation, a second voltage level for the read and write modes of operation, and a third voltage level for the interrogate mode of operation;

a bistable circuit comprising a pair of cross coupled first and second transistors each of which is emitter coupled to a negative voltage source;

a control line connecting said control means to said bistable circuit;

an interrogate sense means connected to said control line for sensing any current change in the control line during the interrogate mode of operation;

output buffer means connected to said bistable circuit, said output buffer means operative to output a binary current indication of the presently stored contents of said bistable circuit in response to said control means providing a second voltage level to said bistable circuit;

current sensing means coupled to said output buffer means for sensing the binary current indication of the presently stored contents of said bistable circuit;

means coupled to said output buffer means for normally back biasing said output buffer means; and means for selectively modifying the normal back bias of said output buffer means, said selective modifying means operative to modify the back biasing on said output buffer means so as to alter the current flow normally present in said control line depending on whether a mismatch occurs during an interrogate operation.

9. The memory cell of claim 8 wherein said interrogate sense means comprises:

means for sampling and holding the current present in said control line immediately prior to initiating an interrogation of the contents of the memory cell;

means for measuring the current present in said control line during the interrogation of the contents of the memory cell; and means connected to said sample and hold means and to said measuring means for detecting any difference between the current measurement made during the interrogation as outputed by said measuring means and the current present in the control line prior to initiating the interrogation operation as outputed by said sample and hold means.

10. The memory cell of claim 9 further comprising:

means, connected to said control means and to said selective modifying means, for activating said selective modifying means after a time delay of time T which is equal to or greater than the time required to sample and hold the current normally present in the control line prior to any interrogation of the memory cell.

1. An associative memory array comprising:

a plurality of $n$ word line control means each of which provides a first voltage level for a standby mode of operation, a second voltage level for either a read or write mode of operation, and a third voltage level for an interrogate mode of operation;

a plurality of bistable circuits arranged in $n$ word groups, each word group consisting of $m$ bistable circuits commonly connected to a respective word line control means;

a plurality of output buffer means each of which is connected to a respective bistable circuit and operative to output a binary current indication of the presently stored bit value stored in said bistable circuit in response to the second voltage level signal being applied to said bistable circuit;

a plurality of $m$ current sensing means, each current sensing means coupled to $n$ output buffer means so as to sense the binary current indications from any of said $n$ output buffer means;

means commonly connected to said plurality of output buffer means so as to normally back bias each of said output buffer means;

a plurality of $m$ means for selectively modifying the normal back biasing on said plurality of output buffer means, each of said $m$ bias modifying means connected to $n$ output buffer means so as to be capable of selectively modifying the back biasing on all $n$ output buffer means in the same manner; and a plurality of $n$ interrogate sensing means, each of which is connected to the output buffer means for each bistable circuit within a respective word group of bistable circuits, each of said interrogate sensing means operative to indicate a match or mismatch condition for the $m$ commonly connected bistable circuits.

12. The associative memory array of claim 11 wherein each of said interrogate sense means comprises a voltage source and a current sensing means, said current sensing means interposed between said voltage source and the output buffer means within the particular word group of bistable circuits.

13. The associative memory array of claim 12 wherein each of said bistable circuits comprises:

a pair of cross coupled first and second transistors each of which is emitter coupled to a negative voltage source.

14. The associative memory array of claim 13 wherein each of said output buffer means comprises:

a pair of output buffer transistors, each output buffer transistor being base connected to one of said pair of cross coupled first and second transistors, and furthermore being collector connected to said interrogate means and emitter connected to said back biasing means.

15. The associative memory array of claim 14 wherein each of said means for selectively modifying the normal back bias on said output buffer means comprises:

a pair of normally non-conducting transistors each of which is collector connected to a respective output buffer means and emitter connected to ground; and means for turning either normally non-conducting transistor on to thereby cause the corresponding collector connected output buffer means to be grounded.

* * * * *